US012795692B2

(12) United States Patent
Wen et al.

(10) Patent No.: US 12,795,692 B2
(45) Date of Patent: Nov. 10, 2026

(54) INDICATION RELATED TO PDCCH MONITORING

(71) Applicant: Nokia Technologies Oy, Espoo (FI)

(72) Inventors: Ping Ping Wen, Shanghai (CN); Ping Yuan, Beijing (CN); Jing Yuan Sun, Beijing (CN); Tzu-Chung Hsieh, Hoffman Estates, IL (US)

(73) Assignee: Nokia Technologies Oy, Espoo (FI)

( * ) Notice: Subject to any disclaimer, the term of this patent is extended or adjusted under 35 U.S.C. 154(b) by 266 days.

(21) Appl. No.: 18/797,073

(22) Filed: Aug. 7, 2024

(65) Prior Publication Data

US 2025/0056562 A1 Feb. 13, 2025

Related U.S. Application Data

(63) Continuation of application No. PCT/CN2023/112365, filed on Aug. 10, 2023.

(51) Int. Cl.
*H04W 72/232* (2023.01)
*H04W 52/02* (2009.01)
*H04W 76/28* (2018.01)

(52) U.S. Cl.
CPC ..... *H04W 72/232* (2023.01); *H04W 52/0229* (2013.01); *H04W 52/0235* (2013.01); *H04W 76/28* (2018.02)

(58) Field of Classification Search
CPC ......... H04W 52/0229; H04W 52/0235; H04W 72/23; H04W 72/232; H04W 76/28
See application file for complete search history.

(56) References Cited

U.S. PATENT DOCUMENTS

2021/0105677 A1* 4/2021 Jang ........................ H04L 5/001
2021/0120577 A1 4/2021 Jiang et al.
2021/0258105 A1* 8/2021 Shrestha .............. H04L 1/1887
2022/0086659 A1 3/2022 Wang et al.
2022/0124614 A1* 4/2022 Wong .................... H04W 76/28
2023/0054066 A1* 2/2023 Ratilainen ............. H04L 1/1887
2023/0209647 A1* 6/2023 Khoshkholgh Dashtaki ............... H04L 1/1822
2023/0345577 A1* 10/2023 Yu ......................... H04L 1/1822
(Continued)

FOREIGN PATENT DOCUMENTS

CN 114424670 A 4/2022
CN 115553060 A 12/2022

OTHER PUBLICATIONS

"Solutions for NR to support non-terrestrial networks (NTN)", 3GPP TSG RAN meeting #88e, RP-201256, Agenda: 9.10.6, Thales, Jun. 29-Jul. 3, 2020, 10 pages.
(Continued)

*Primary Examiner* — Brendan Y Higa
(74) *Attorney, Agent, or Firm* — Barta Jones, PLLC

(57) ABSTRACT

Embodiments of the present disclosure relate to an indication associated with PDCCH monitoring. In an aspect, a terminal device receives from a network device, downlink control information (DCI) comprising an indication of an operation associated with at least one of physical downlink control channel (PDCCH) monitoring or discontinuous reception (DRX). The terminal device performs the operation based on the indication. The embodiments of the present disclosure can provide more flexibility on scheduling and can save power consumption.

20 Claims, 4 Drawing Sheets

(56) References Cited

U.S. PATENT DOCUMENTS

| | | | | |
|---|---|---|---|---|
| 2024/0049251 | A1* | 2/2024 | Xu | H04W 72/232 |
| 2024/0163962 | A1* | 5/2024 | Freda | H04W 76/28 |
| 2024/0224376 | A1* | 7/2024 | Yang | H04W 52/0216 |
| 2024/0283578 | A1* | 8/2024 | Rico Alvarino | H04L 1/1822 |
| 2024/0284552 | A1* | 8/2024 | Jiang | H04L 1/1848 |
| 2025/0323761 | A1* | 10/2025 | Löhr | H04W 72/232 |

OTHER PUBLICATIONS

"New WID on IoT NTN enhancements", 3GPP TSG RAN Meeting #94e, RP-212729, AT&T, Dec. 6-17, 2021, 5 pages.

"3rd Generation Partnership Project; Technical Specification Group Radio Access Network; Evolved Universal Terrestrial Radio Access (E-UTRA); Physical layer procedures (Release 17)", 3GPP TS 36.213, V17.5.0, Mar. 2023, pp. 1-584.

"3rd Generation Partnership Project; Technical Specification Group Radio Access Network; Evolved Universal Terrestrial Radio Access (E-UTRA); Medium Access Control (MAC) protocol specification (Release 17)", 3GPP TS 36.321, V17.5.0, Jun. 2023, pp. 1-146.

"3rd Generation Partnership Project; Technical Specification Group Radio Access Network; Evolved Universal Terrestrial Radio Access (E-UTRA); Radio Resource Control (RRC); Protocol specification (Release 17)", 3GPP TS 36.331, V17.5.0, Jun. 2023, pp. 1-1134.

International Search Report and Written Opinion received for corresponding Patent Cooperation Treaty Application No. PCT/CN2023/112365, dated Apr. 11, 2024, 7 pages.

"Discussion on PDCCH monitoring reduction during DRX active time", 3GPP TSG RAN WG1 #106-e, R1-2107416, Agenda: 8.7.2, CMCC, Aug. 16-27, 2021, 3 pages.

* cited by examiner

INDICATION RELATED TO PDCCH MONITORING

FIELD

Various example embodiments relate to the field of communications and in particular, to a terminal device, a network device, methods, apparatuses and a computer readable storage medium for an indication associated with PDCCH monitoring.

BACKGROUND

In the communications area, there is a constant evolution ongoing in order to provide efficient and reliable solutions for utilizing wireless communication networks. Each new generation has it owns technical challenges for handling the different situations and processes that are needed to connect and serve devices connected to the wireless network. To meet the demand for wireless data traffic having increased since deployment of 4th generation (4G) communication systems, efforts have been made to develop an improved 5th generation (5G) or pre-5G communication system. The new communication systems can support various types of service applications for terminal devices.

Some communication technologies relate to non-terrestrial communication. Non-terrestrial communication can be in a complementary manner to terrestrial deployments where satellite connectivity can provide coverage beyond terrestrial deployments. 3GPP has defined a work item for Rel-17 on non-terrestrial networks (NTN) in RP-201256 and a work item for R18 on IoT-NTN performance enhancements in RP-212729. Hybrid automatic repeat request (HARQ) enabled/disabled is one important feature in both work items. The benefit of disabling HARQ feedback for NTN and IoT over NTN is to enable the gNB to reuse an HARQ process ID before a full HARQ RTT has elapsed to avoid the HARQ stalling and reduce the transmission latency as well as enable peak throughput.

SUMMARY

In general, example embodiments of the present disclosure provide a solution for an indication related to PDCCH monitoring, especially dynamic indications related to the PDCCH monitoring.

In a first aspect, there is provided a terminal device. The terminal device comprises at least one processor and at least one memory including computer program codes; the at least one memory and the computer program codes are configured to, with the at least one processor, cause the terminal device to receive, from a network device, downlink control information (DCI) comprising an indication of an operation associated with at least one of physical downlink control channel (PDCCH) monitoring or discontinuous reception (DRX); and perform the operation based on the indication.

In a second aspect, there is provided a network device. The network device comprises at least one processor and at least one memory including computer program codes; the at least one memory and the computer program codes are configured to, with the at least one processor, cause the network device to determine, for a terminal device, an indication indicating an operation associated with at least one of physical downlink control channel (PDCCH) monitoring or discontinuous reception (DRX); and transmit the indication via a downlink control information (DCI).

In a third aspect, there is provided a method. The method comprises: receiving, at a terminal device and from a network device, downlink control information (DCI) comprising an indication of an operation associated with at least one of physical downlink control channel (PDCCH) monitoring or discontinuous reception (DRX); and performing the operation based on the indication.

In a fourth aspect, there is provided a method. The method comprises: determining, at a network device and for a terminal device, an indication indicating an operation associated with at least one of physical downlink control channel (PDCCH) monitoring or discontinuous reception (DRX); and transmitting the indication via a downlink control information (DCI).

In a fifth aspect, there is provided an apparatus comprising means for receiving, at a terminal device and from a network device, downlink control information (DCI) comprising an indication of an operation associated with at least one of physical downlink control channel (PDCCH) monitoring or discontinuous reception (DRX); and means for performing the operation based on the indication.

In a sixth aspect, there is provided an apparatus comprising means for determining, at a network device and for a terminal device, an indication indicating an operation associated with at least one of physical downlink control channel (PDCCH) monitoring or discontinuous reception (DRX); and means for transmitting the indication via a downlink control information (DCI).

In a seventh aspect, there is provided a non-transitory computer readable medium comprising program instructions for causing an apparatus to perform at least the method according to any one of the above third to fourth aspect.

In an eighth aspect, there is provided a computer program comprising instructions, which, when executed by an apparatus, cause the apparatus at least to: receive, from a network device, downlink control information (DCI) comprising an indication of an operation associated with at least one of physical downlink control channel (PDCCH) monitoring or discontinuous reception (DRX); and perform the operation based on the indication.

In a ninth aspect, there is provided a computer program comprising instructions, which, when executed by an apparatus, cause the apparatus at least to: determine, for a terminal device, an indication indicating an operation associated with at least one of physical downlink control channel (PDCCH) monitoring or discontinuous reception (DRX); and transmit the indication via a downlink control information (DCI).

In a tenth aspect, there is provided a terminal device. The terminal device comprises receiving circuitry configured to receive, from a network device, downlink control information (DCI) comprising an indication of an operation associated with at least one of physical downlink control channel (PDCCH) monitoring or discontinuous reception (DRX); and performing circuitry configured to perform the operation based on the indication.

In an eleventh aspect, there is provided a network device. The network device comprises determining circuitry configured to determine, for a terminal device, an indication indicating an operation associated with at least one of physical downlink control channel (PDCCH) monitoring or discontinuous reception (DRX); and transmitting circuitry configured to transmit the indication via a downlink control information (DCI).

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, in which.

Throughout the drawings, the same or similar reference numerals represent the same or similar element.

DETAILED DESCRIPTION

Figure 1:
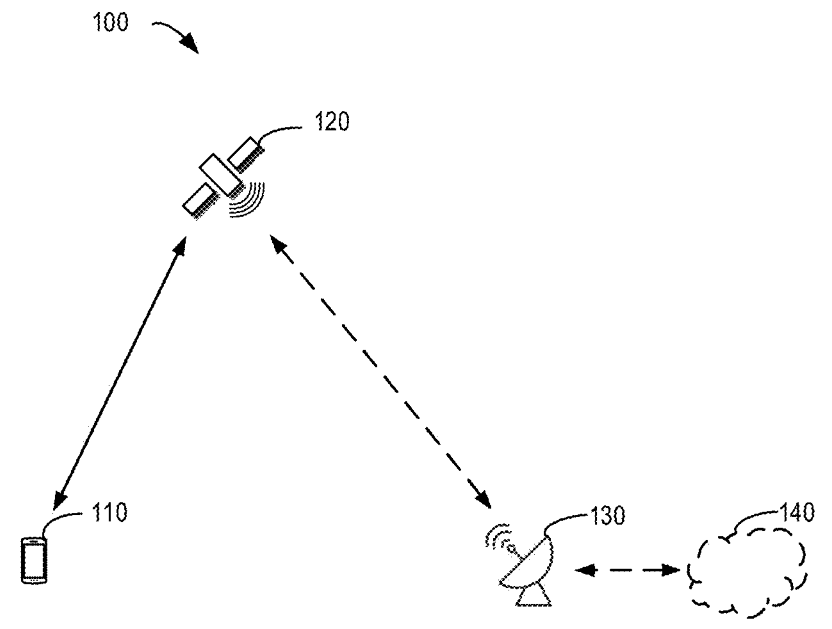
FIG. 1 illustrates an example system in which embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory (ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) the future sixth generation (6G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB (eNodeB)), a NR (new radio) NB (also referred to as a gNB (gNodeB)), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

Some embodiments of the present disclosure relate to a solution of dynamic indication on PDCCH monitoring in IoT NTN. In NR NTN, disabling HARQ feedback for downlink transmission is semi-static configured by radio resource control (RRC) signalling. The configuration is indicated per HARQ process index by a bitmap manner, e.g., 32 bit bitmap if the configured HARQ process number is 32. In IoT over NTN, HARQ feedback disabling or enabling discussion is ongoing. Both HARQ feedback enabling and disabling was agreed to be supported to guarantee the reliability of some important media access control control element (MAC CE) and RRC signalling as well as avoid HARQ stalling. Due to the number of HARQ processes in IoT and enhanced machine-type communication (eMTC) may be smaller than the NR UE, e.g., at most two HARQ processes for NB-IoT, 4 HARQ processes for eMTC CE mode B, there may need large signalling on reconfiguration HARQ feedback enabling/disabling if re-using the NR NTN solution. Therefore, dynamic HARQ feedback enabling or disabling is discussed for IoT over NTN. The current agreement in RAN1 is to support both Option 1 (i.e., per HARQ process via UE specific RRC signaling in a semi-static way) and Option 3 (i.e., explicitly indicated by DCI dynamically) to dynamically disable or enable HARQ feedback for NB-IoT and eMTC CE mode B. The detailed solution on how to use Option 1 and Option 3 is still in discussion. Furthermore, RAN1 also agreed Option 3 can override Option 1 configuration.

There are the following agreements achieved in RAN1 meetings:

Agreement in RAN1#112 meeting:

Confirm the following working assumption with the following update:

Working assumption

For NB-IoT NTN and eMTC NTN for CE Mode B, to configure/indicate enabling/disabling of HARQ feedback for downlink transmission:

Support Option 1 in case only per-HARQ process bitmap signaling is configured

Support Option 3 DCI direct indication of HARQ feedback enable/disable in case only DCI solution enabling/disabling signaling is configured Support Option 3 DCI indication to override Option 1 configuration for corresponding transmission in case both per-HARQ process bitmap and DCI solution enabling/disabling signaling are configured FFS #1: Option 3 DCI-based overridden mechanism is applied to both semi-statically HARQ feedback enabled and disabled processes or only applied to semi-statically HARQ feedback disabled processes or only applied to semi-statically HARQ feedback enabled processes.

FFS #2: whether/how to support Option 3 overriding Option 1 configuration for corresponding transmission for multiple TBs scheduled by single DCI FFS#3: Option 3 DCI-based overridden mechanism is DCI signaling to reverse the HARQ feedback enable/disable for the corresponding transmission from per-HARQ process RRC configuration or DCI signaling to directly indicate the HARQ feedback enable/disable for the corresponding transmission regardless of per-HARQ process RRC configuration.

RAN1 strives to have a common design (in terms of DCI design, PDCCH monitoring, etc.) for "Option 3" and "Option 3 + Option 1".

For eMTC NTN, to configure/indicate enabling/disabling of HARQ feedback for downlink transmission, take Option 1 for CE Mode A.

Agreements in Ran1#113 meeting:

Working assumption

For DCI-based direct indication in single TB scheduled by DCI,

Indication by reusing/reinterpreting HARQ-ACK related field in DCI

For eMTC CE mode B, one state of "HARQ-ACK resource offset" field in DCI format 6-1B is used for indication of HARQ feedback disabled, other states are used for indication of HARQ feedback enabled and corresponding HARQ-ACK resource.

-continued

| |
|---|
| FFS: detailed state, and whether this state is different across different UEs |
| For NBIoT, one state of "HARQ-ACK resource" field in DCI format N1 is used for indication of HARQ feedback disabled, other states are used for indication of HARQ feedback enabled and corresponding HARQ-ACK resource. |
| FFS: detailed state, and whether this state is different across different UEs |
| If reusing/reinterpreting HARQ-ACK related field in DCI is also used for DCI overriding scheme, the interpretation of the state can be different than for DCI-based direct indication. |
| Agreements in Ran1#113 meeting: |
| For single TB scheduled by DCI, |
| Working assumption 1 DCI based overridden indication is applied to both semi-statically HARQ disabled and enabled processes |
| For DCI based overridden indication, adopt indication by reusing/reinterpreting HARQ-ACK related field in DCI |
| For eMTC CE mode B, "HARQ-ACK resource offset" field in DCI format 6-1B is used for indication of maintaining/reversing the HARQ feedback enable/disable for the corresponding transmission from per-HARQ process RRC configuration and corresponding HARQ-ACK resource in case of indication of HARQ feedback enabled. |
| HARQ feedback disabled is reversed to enabled in case of any states other than state A in "HARQ-ACK resource offset", otherwise is maintained as disabled. |
| HARQ feedback enabled is maintained in case of any states other than state A in "HARQ-ACK resource offset", otherwise is reversed to disabled. |
| FFS: detailed state A, and whether this state A is different across different UEs |
| For NBIoT, "HARQ-ACK resource" field in DCI format N1 is used for indication of maintaining/reversing the HARQ feedback enable/disable for the corresponding transmission from per-HARQ process RRC configuration and corresponding HARQ-ACK resource in case of indication of HARQ feedback enabled. |
| The same DCI indication functionality as eMTC is adopted. |
| Working assumption 2 For Option 1 + Option 3 DCI based overridden mechanism, for a HARQ process configured as HARQ feedback disabled by per-HARQ process bitmap signaling and further reversed to HARQ feedback enabled by DCI, the NBIoT UE does not wait for an RTT + 3 ms (i.e., till subframe n + Kmac + 3 in TS36.213 section 16.6) before monitoring NPDCCH for the same HARQ process (or monitoring any NPDCCH for the case of single HARQ process configuration). |
| Send an LS to RAN2 with the following contents: |
| RAN1 respectfully ask RAN2 for the feasibility of Working assumption 2 (taking into account potential RAN2 spec impact). |

In NR NTN solution, supporting HARQ feedback disabled or enabled is closely related to two things: HARQ feedback and connected DRX operation (i.e., PDCCH monitoring timing for the retransmission when UE is in DRX active time). For HARQ feedback disabled, the ACK (acknowledgement)/NACK (negative acknowledgement) information will not be reported to the network and the DRX HARQ RTT (round trip time) timer will not be started, which means the NW (network) may continue scheduling the retransmission or new transmission without waiting a RTT time length to get the decoding results of the transmissions (as shown at case 3 in Table 1 below). For HARQ feedback enabled, the ACK/NACK information will be reported to the network and the DRX HARQ RTT timer is started and drx-HARQ-RTT-TimerDL length is increased by UE-gNB RTT. In this case, the NW needs to wait a RTT time length to get the decoding result of the transmission therefore schedule the retransmission or new transmission based on the decoding results (as shown at case 2 in Table 1 below). However, for IoT NTN, there is a working assumption reached in RAN #113 meeting as below. RAN1 is asking RAN2 for the feasibility of the WA (work assumption) considering the impact to RAN2 spec (mainly for DRX):

| |
|---|
| "For Option 1 + Option 3 DCI based overridden mechanism, for a HARQ process configured as HARQ feedback disabled by per-HARQ process bitmap signaling and further reversed to HARQ feedback enabled by DCI, the NBIoT UE does not wait for an RTT+3ms (i.e., till subframe n + Kmac + 3 in TS36.213 section 16.6) before monitoring NPDCCH for the same HARQ process (or monitoring any NPDCCH for the case of single HARQ process configuration). |

This WA means for the case that a HARQ process is configured as HARQ feedback disabled by per-HARQ process bitmap signaling (e.g. via RRC) and further reversed to HARQ feedback enabled by DCI, the ACK/NACK information will be reported to the network while the drx-HARQ-RTT-TimerDL length will not be increased by UE-gNB RTT (as case 4 in Table1). For this case, the UE behavior is different with both HARQ feedback disabled and HARQ feedback enabled as agreed in NR NTN, and it has both the advantages of HARQ feedback as well as the fast scheduling (without waiting for UE-gNB RTT).

In detail, HARQ feedback enabling can target for high reliability transmission for MAC CE and is beneficial for link adaptation. The WA that NB-IoT UE does not wait for an RTT+3 ms before monitoring NPDCCH (narrowband physical downlink control channel) for the same HARQ process can support fast scheduling and avoid HARQ stalling.

However, in some other cases that HARQ stalling is not the key issue and achieving the transmission reliability is the key motivation, the NW may only schedule a retransmission or new transmission after UE-eNB RTT to get the decoding result of the previous transmission. This is more resource efficient solution compared other solution on improving reliability such as robust MCS (modulation and coding scheme) setting or blind retransmission. In this case, the UE keep monitoring the PDCCH without waiting for an RTT+3 ms as the current WA will cause the issue of unnecessary UE power consumption.

Moreover, the issue becomes serious in the case of single HARQ process. For a HARQ process configured as HARQ feedback disabled by per-HARQ process bitmap signaling and further reversed to HARQ feedback enabled by DCI, if following the current RAN1 WA that "the NBIOT UE does not wait for an RTT+3 ms (i.e., till subframe n+Kmac+3 in TS36.213 section 16.6) before monitoring NPDCCH for the same HARQ process (or monitoring any NPDCCH for the case of single HARQ process configuration).", the UE behavior on DRX operation (i.e., PDCCH monitoring timing for the retransmission) and HARQ feedback will follow case 4 in Table 1. Similarly, for a HARQ process configured as HARQ feedback disabled by per-HARQ process bitmap signaling and further DCI indicates HARQ feedback disabling, the UE behavior on DRX operation (i.e., PDCCH monitoring timing for the retransmission) and HARQ feedback will be as case 3 in Table 1. In summary, as long as a HARQ process is configured as feedback disabled by the per-HARQ process bitmap, the NB-IoT UE will always monitor the PDCCH without waiting for the RTT for that HARQ process, which is very power inefficient solution.

Therefore, in some embodiments of the present disclosure, one dynamic solution on indication on whether the UE shall monitor PDCCH after UE-eNB RTT should be supported which can provide more flexibility on scheduling and power consumption saving.

TABLE 1

UE behavior on PDCCH monitoring /DRX and HARQ feedback

| | PDCCH monitoring, scheduling/DRX operation | HARQ feedback |
|---|---|---|
| Case 1 | Wait for RTT/RTT timer is extended | No |
| Case 2 | Wait for RTT/RTT timer is extended | Yes |
| Case 3 | Without waiting for RTT/RTT timer is not started | No |
| Case 4 | Without waiting for RTT/RTT timer is not started | yes |

Principle and embodiments of the present disclosure will be described in detail below with reference to the accompanying drawings. Reference is first made to FIG. 1, which illustrates an example system 100 in which embodiments of the present disclosure may be implemented. The system 100, for example, a communication network, includes a plurality of network device(s) and terminal device(s), such as a terminal device 110 and a network device 120. In NR NTN scenarios, the network device 120 may be a NTN device, for example, a low earth orbiting (LEO) satellite, a medium earth orbiting (MEO) satellite, or a geostationary earth orbiting (GEO) satellite. The terminal device 110 may communicate with the network device 120, for example, the terminal device 110 may receive configuration information and/or an indication from the network device 120, and perform operation(s) based on the configuration information and/or the indication. In some examples, the system 100 may also include a network device 130, for example, a ground station, the network device 120 (e.g the NTN device) may function as a transmission relay node between the network device 130 and the terminal device 110 in a transparent manner. As an example, the terminal device 110 may receive, via the network device 120, the configuration information and/or the indication from the network device 130. In some examples, the system 100 may also include a data network 140. The network device 130 and the data network 140 (e.g., the Internet, an intranet, a wide area network, etc.) may connect to each other over a wired and/or wireless network. Additionally or alternatively, the network device 130 may be connected to other core network elements not shown in FIG. 1, such as servers, access points, switches, routers, nodes, etc. The solution of the embodiments of the present disclosure may be implemented between the terminal device 110 and the network device 120, or between the terminal device 110 and the network device 130 (via the network device 120 as a transmission relay node). The embodiments herein are mainly described based on the terminal device 110 and the network device 130.

It is to be understood that the number of network devices and terminal devices is only for the purpose of illustration without suggesting any limitations. The system 100 may include any suitable number of network devices and terminal devices adapted for implementing embodiments of the present disclosure.

Communications in the system 100 may be implemented according to any proper communication protocol(s), comprising, but not limited to, cellular communication protocols of the first generation (1G), the second generation (2G), the third generation (3G), the fourth generation (4G), the fifth generation (5G) and the sixth generation (6G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 2:
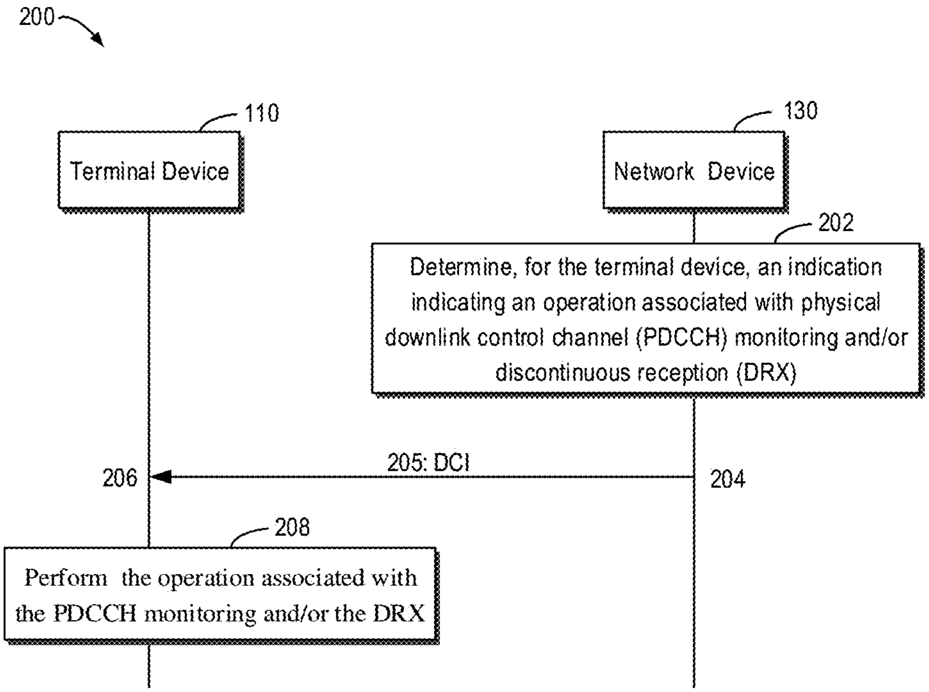
FIG. 2 illustrates a flowchart illustrating a process for dynamic indication on PDCCH monitoring according to some embodiments of the present disclosure.

Reference is now made to FIG. 2, which shows a process 200 for dynamic indication on PDCCH monitoring according to an embodiment of the present disclosure. For the purpose of discussion, the process 200 will be described with reference to FIG. 1. The process 200 may involve the terminal device 110 and the network device 130 as illustrated in FIG. 1. It would be appreciated that although the process 200 has been described in the system 100 of FIG. 1, this process may be likewise applied to other communication systems.

In the process 200, the network device 130 may determine (202), for the terminal device 110, an indication indicating an operation associated with physical downlink control channel (PDCCH) monitoring and/or discontinuous reception (DRX). Then the network device 130 may transmit (204), to the terminal device 110, the indication via a downlink control information (DCI) 205. On the terminal device 110 side, the terminal device 110 may receive (206), from the network device 130, the DCI 205 comprising the indication of the operation associated with the PDCCH monitoring and/or the DRX.

In addition, in some embodiments, the network device 130 may transmit to the terminal device 110, and the terminal device 110 may receive from the network device 130, a configuration comprising at least one set of values associated with a field of the DCI. The indication may include one of a set of values among the at least one set of values. In some examples, the set of values may comprise a first subset associated with waiting for a time length prior to the operation associated with at least one of the PDCCH monitoring or the DRX, and a second subset associated with not waiting for the time length prior to the operation associated with at least one of the PDCCH monitoring or the DRX.

In some embodiments of the configuration comprising one set of values, the field of the DCI may be a hybrid automatic repeat request acknowledgement (HARQ-ACK) resource field, or a repetition number field, or a modulation and coding scheme (MCS) field. In some embodiments of the configuration comprising a plurality of sets of values, the field of the DCI may be a HARQ-ACK resource field. As an example some fields such as "HARQ-ACK resource", "repetition number" and "MCS" in DCI format N1 are shown in Table 2.

TABLE 2

DCI format N1 for NPDSCH scheduling

| Field | Size (bits) |
|---|---|
| Flag for N0/N1 differentiation | 1 |
| NPDCCH order indicator | 1 |
| Scheduling delay | 3 |
| Resource assignment | 3 |
| MCS | 4 |
| Repetition number | 4 |
| NDI | 1 |
| HARQ-ACK resource | 4 |
| DCI subframe repetition number | 2 |

As shown in Table 2, DCI signaling of indication the PDCCH monitoring timing may be achieved by reusing/reinterpreting some fields such as "HARQ-ACK resource", "repetition number" and "MCS", etc. Specifically, the Table 2 shows DCI format N1 for NPDSCH scheduling in NB-IoT. For the solution that DCI indication is achieved by reusing/reinterpreting "HARQ-ACK resource" field in the DCI, the configuration may comprise a plurality of sets of values, and the first subset or the second subset may comprise one or more values. The network may determine and configure/indicate the number of values in the subsets for two options taking into account factors such as reliability, scheduling efficiency, throughput (i.e., HARQ stalling) etc. The two options above may correspond to waiting for a time length prior to the operation associated with at least one of the PDCCH monitoring or the DRX, and not waiting for the time length prior to the operation associated with at least one of the PDCCH monitoring or the DRX, respectively, the corresponding examples may refer to Option 1A and Option 1B below. The number of HARQ-ACK resource field values is balanced between the two subsets, which can reduce the impact on the scheduling flexibility with less values of "HARQ-ACK resource". In addition, this solution also applies for uplink, DCI signalling of indication the PDCCH monitoring timing may be achieved by reusing/reinterpreting some fields such as "repetition number" and "MCS" in DCI format NO for NPDSCH scheduling in NB-IoT. Furthermore, this solution also applies for eMTC uplink and downlink as well as NR uplink and downlink. DCI signalling of indication the PDCCH monitoring timing may be achieved by reusing/reinterpreting some fields (if exsits), such as "repetition number" and "MCS", "HARQ-ACK resource offset", "PDSCH-to-HARQ_feedback timing indicator" in the corresponding DCI format.

In some examples, the plurality of sets of values may be configured in a table, and each of the plurality of sets of values corresponds to an index. An index corresponding to one of the plurality of sets of values may be included in a MAC CE. In these embodiments, the value among the plurality of sets of values are indicated to the terminal device 110 via the DCI, and the index are indicated to the terminal device 110 via the MAC CE. The terminal device may determine, based on the index, one set of the plurality of sets, and based on the set corresponding to the index and the value indicated, determine whether to wait for the time length prior to the operation associated with the PDCCH monitoring and/or the DRX. It is noted that, the MAC CE is a new MAC CE different existing MAC CEs.

In some embodiments, if the field of the DCI is a HARQ-ACK resource field, the set of values comprising the first subset and the second subset are for indicating HARQ feedback in a HARQ process associated with the operation as enabled. For example, if the fields is "HARQ-ACK resource", the indication may indicate both HARQ feedback enabled and waiting for a time length prior to the operation associated with the PDCCH monitoring and/or the DRX, alternatively, may indicate both HARQ feedback enabled and not waiting for a time length prior to the operation associated with the PDCCH monitoring and/or the DRX.

Based on the indication received from the network device 130, the terminal device 110 may perform (208) the operation associated with the PDCCH monitoring and/or the DRX. Specifically, in some examples, the terminal device 110 may, based on determining that the indication includes a value among the first subset, wait for a time length prior to the operation associated with the PDCCH monitoring or the DRX or the both above. In some other examples, the terminal device 110 may, based on determining that the indication includes a value among the second subset, prevent from waiting for the time length prior to the operation associated with the PDCCH monitoring and/or the DRX. In some embodiments, the time length above may equal to round trip time (RTT) plus a predetermined duration. The predetermined duration may be predetermined network device processing time. In some examples for the PDCCH monitoring, the predetermined duration may be 3 ms, for example, based on determining that the indication includes a value among the first subset, the terminal device 110 may wait for RTT+3 ms prior to the operation associated with the PDCCH monitoring, or based on determining that the indication includes a value among the second subset, the terminal device will not wait for RTT+3 ms prior to the operation associated with the PDCCH monitoring. In some other examples for the DRX, the predetermined duration may be 0 ms, for example, based on determining that the indication includes a value among the first subset, the terminal device 110 may wait for RTT prior to the operation associated with the DRX, or based on determining that the indication includes a value among the second subset, the terminal device will not wait for RTT prior to the operation associated with the DRX.

In some embodiments, in order to prevent from waiting for the time length, for the case of the operation being associated with the PDCCH monitoring, specifically, the terminal device 110 may prevent from waiting for the time length (may be referred to as a first time length in this example) prior to the operation associated with the PDCCH monitoring, and may monitor the PDCCH in a subframe (may be any subframe) starting from the end of a hybrid automatic repeat request (HARQ) feedback transmission plus a second time length. Here the hybrid automatic repeat request (HARQ) feedback transmission corresponds to the PDSCH scheduled by the DCI in which the indication is included. In some embodiments, the second time length may be a guard period for uplink to downlink switch, for example, one millisecond (ms). For example, a UE (an example of the terminal device 110) may monitor NPDCCH in any subframe starting from the end of HARQ feedback transmission plus 1 ms.

In some other embodiments, in order to prevent from waiting for the time length, for the case of the operation being associated with the DRX, specifically, in some examples, the terminal device 110 may prevent from waiting for the time length prior to the operation associated with the DRX, and prevent from starting a timer associated with HARQ round trip time (RTT) for a HARQ process. In some examples, the timer associated with HARQ RTT may be a HARQ RTT Timer. The terminal device 110 may not start the HARQ RTT Timer. Additionally or alternatively, in some other examples, the terminal device 110 may prevent from waiting for the first time length prior to the operation associated with the DRX, and may enter a DRX active state in a subframe starting from the end of a HARQ feedback transmission plus a second time length (e.g. 1 ms). In some examples, in order to enter the DRX active state, the terminal device 110 may start or restart, from the end of a HARQ feedback transmission plus the second time length (e.g. 1 ms), a timer associated with DRX inactivity. In some examples, the timer associated with DRX inactivity may be a drx-InactivityTimer.

If the terminal device 110 enters the DRX active state, as an example, the terminal device 110 may be in active for a time duration. The time duration may be associated with one of the following: a timer associated with DRX-retransmission or a short TTI of the timer associated with DRX-retransmission for a HARQ process, or a timer associated with DRX inactivity. In some examples, the timer associated with DRX inactivity may be a drx-InactivityTimer. The timer associated with HARQ RTT may be HARQ RTT Timer. a timer associated with DRX-retransmission may be drx-RetransmissionTimer. The short TTI of the timer associated with DRX-retransmission may be drx-RetransmissionTimerShortTTI. In these embodiments, for example, if the indication indicates that the UE will not wait for the time length prior to the operation associated with the DRX, the UE may enter DRX active state after the end of HARQ feedback transmission plus a time length, specifically, the UE may start/restart the drx-InactivityTimer, additionally or alternatively, the UE may enter the active time after the end of HARQ feedback transmission plus a time length (e.g. 1 ms), and keep in active for a duration which equals to drx-Retransmission Timer or drx-Retransmission TimerShortTTI for the corresponding HARQ process or drx-Inactivity Timer In some other embodiments, in order to wait for the time length, for the case of the operation being associated with the DRX, specifically, the terminal device 110 may wait for the time length prior to the operation associated with the DRX, wherein a timer associated with HARQ RTT for a HARQ process is increased by a RTT. In some examples, the timer associated with HARQ RTT may be a HARQ RTT Timer. The HARQ RTT Timer is increased by a RTT.

On the network device 130 side, in some examples, the network device 130 may configure, for a HARQ process associated with the operation associated with the PDCCH monitoring or the DRX or the combination thereof, and through a radio resource control (RRC) signaling, HARQ feedback as disabled, and may indicate, by the DCI, the HARQ feedback as enabled. In other word, for the terminal device 110, the HARQ feedback in the HARQ process associated with the operation is configured as disabled through the RRC signaling, and the DCI indicates that the HARQ feedback is enabled. As an example, in the case that the HARQ feedback above is configured as disabled through the RRC signalling and then indicated as enabled by the DCI, the terminal device 110 receives the DCI comprising the indication of the operation associated with the PDCCH monitoring and/or the DRX above, that is, the operation associated with the PDCCH monitoring and/or the DRX may be dynamically indicated by the network device 130 via the DCI. For example, for IoT over NTN, when both Option 1 (RRC based signaling) and Option 3 (DCI based signaling) are configured on indication of HARQ feedback enabled and disabled, for a HARQ process configured as HARQ feedback disabled by per-HARQ process bitmap signaling and further reversed to HARQ feedback enabled by DCI, the PDCCH monitoring timing can be dynamically indicated by NW (e.g. the gNB, an example of the network device 130) to a UE (an example of the terminal device 110).

The solution of some embodiments has the advantage of being fully dynamic on informing the UE on PDCCH monitoring and provide the flexibility on scheduling timing and optimization of power consumption.

In some embodiments of the present disclosure, the proposed solution of DCI based indication on PDCCH monitoring in IoT over NTN may be applied for the case that both Option 1 (RRC based signaling) and Option 3 (DCI based signalling) are configured on indication of HARQ feedback enabled and disabled. With this solution, the NW (i.e., network, e.g. the network device 130) can dynamically inform the UE on PDCCH monitoring and provide the flexibility on scheduling timing and optimization of UE's power consumption, because the NW exactly know whether it will schedule UE after the previous transmission therefore whether UE needs to monitor PDCCH with or without waiting for RTT+3 ms.

If both Option 1 (RRC signaling on HARQ feedback disabling/enabling) and Option 3 (DCI signaling based HARQ feedback disabling/enabling) are configured, the DCI based signaling overrides the RRC signaling as the current RAN1 agreement. The details of the solution will be described with reference to FIG. 3.

Figure 3:
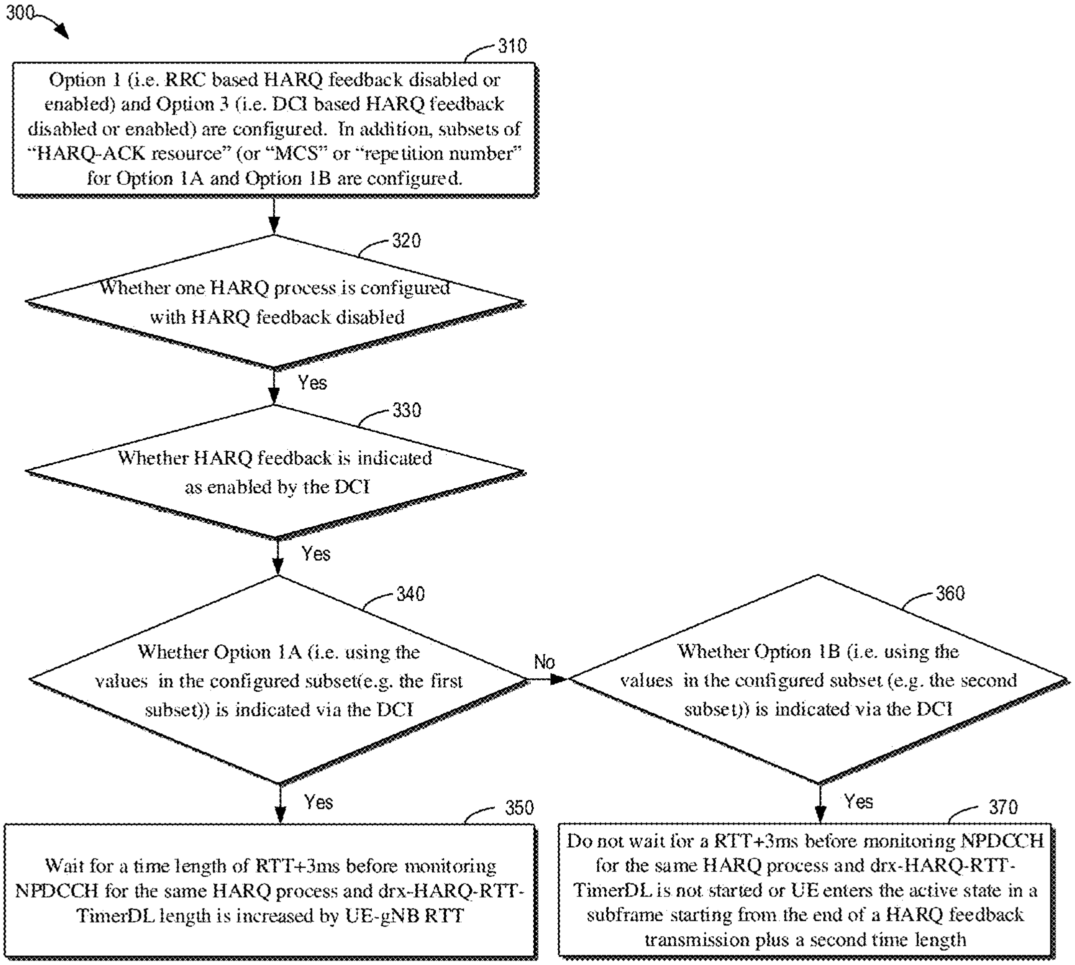
FIG. 3 illustrates a flowchart illustrating a process for dynamic indication on PDCCH monitoring according to some other embodiments of the present disclosure.

FIG. 3 shows a flowchart illustrating a process 300 for dynamic indication on PDCCH monitoring according to some other embodiments of the present disclosure. In FIG. 3, the as an example, a terminal device (e.g. the terminal device 110) may be a UE, a network device may be referred to as network or NW for short, and the network device may be the network device 130, e.g. a gNB. As shown in FIG. 3, the process may be performed by the UE, at 310, Option 1 (i.e. RRC based HARQ feedback disabled or enabled) and Option 3 (i.e. DCI based HARQ feedback disabled or enabled) are configured. In addition, subsets of "HARQ-ACK resource" (or "MCS" or "repetition number" for Option 1A and Option 1B are configured. Specifically, the Option 1A and the Option 1B are as below. Option 1A: NBIOT UE should wait for a RTT+3 ms (i.e., till subframe n+Kmac+3 in TS36.213 section 16.6) before monitoring NPDCCH for the same HARQ process and DRX behavior will follow the solution of HARQ feedback is enabled, e.g., drx-HARQ-RTT-TimerDL length is increased by UE-gNB RTT. Option 1B: NBIOT UE does not wait for a RTT+3 ms (i.e., till subframe n+Kmac+3 in TS36.213 section 16.6) before monitoring NPDCCH for the same HARQ process and DRX behavior will solution follow the of HARQ feedback is disabled, e.g., drx-HARQ-RTT-TimerDL is not started or the NBIOT UE enters the active state in a subframe starting from the end of a HARQ feedback transmission plus a second time length.

For a HARQ process configured as HARQ feedback disabled by per-HARQ process bitmap signaling and further reversed to HARQ feedback enabled by a DCI, the NW may dynamically inform the UE whether to monitor PDCCH after RTT, i.e., Case 2 or Case 4 in Table 1. Specifically, in some embodiments, the network may configure one subset (may be referred to as a first subset) of "HARQ-ACK resource" field (or "repetition number", or "MCS") for an indication of Option 1A (i.e., Case 2 in Table 1) and another subset (may be referred to as a second subset) of "HARQ-ACK resource" field (or "repetition number", "MCS") for an indication of Option 1B (i.e., Case 4 in Table1).

Continuing with reference to FIG. 3, at 320, the UE may determine that whether one HARQ process is configured with HARQ feedback disabled, if yes, at 330, then the UE may determine whether HARQ feedback is indicated as enabled by the DCI. In the case of the UE determining that HARQ feedback is indicated as enabled by the DCI, as shown at 340, the UE determines whether Option 1A (i.e. using the values in the configured subset (e.g. the first subset)) is indicated via the DCI, and if yes, 350 is performed, otherwise, 360 is performed. In some examples, if the fields of "HARQ-ACK resource" is used to indication Option 1A or Option 1B, 330 and 340 can be performed together, in these examples (330 and 340 are combined to be performed), the UE may determine whether HARQ feedback is indicated as enabled and Option 1A (i.e. using the values in the configured subset (e.g. the first subset)) is indicated by the DCI, otherwise, the UE may determine whether HARQ feedback is indicated as enabled and Option 1B is indicated by the DCI. In other words, if the fields is "HARQ-ACK resource", the indication may indicate "both HARQ feedback enabled and Option 1A" or "both HARQ feedback enabled and Option 1B". At 350, when the UE receives the DCI indicating Option 1A with a value from the configured subset (e.g. the first subset), the UE should wait for a time length of RTT+3 ms before monitoring NPDCCH for the same HARQ process and drx-HARQ-RTT-TimerDL length is increased by UE-gNB RTT. At 360, the UE may determine whether Option 1B (i.e. using the values in the configured subset (e.g. the second subset)) is indicated via the DCI, if yes, as shown at 370, when the UE receives the DCI indicating Option 1B with a value from the configured subset (e.g. the second subset), the UE does not wait for a RTT+3 ms before monitoring NPDCCH for the same HARQ process and drx-HARQ-RTT-TimerDL is not started or UE enters the active state in a subframe starting from the end of a HARQ feedback transmission plus a second time length. In this way, the NW may provide the flexibility on scheduling timing and optimization of power consumption.

According to the embodiments mentioned above, the DCI indication may be achieved by reusing/reinterpreting some fields, such as "HARQ-ACK resource", or "repetition number" or "MCS" field in the DCI. Some examples corresponding to the "HARQ-ACK resource", or "repetition number" or "MCS" field will be further described respectively below.

In some examples (may be called as Option 2A), in Option 2A, the above DCI indication are achieved by reusing/reinterpreting "HARQ-ACK resource" field in DCI. In some embodiments, one state of "HARQ-ACK resource" field in DCI format N1 is used for indication of HARQ feedback disabled, the remaining states which are used for indication of HARQ feedback enabled may be divided into two subsets, one subset (e.g. the first subset) can be used for indication of Option 1A as well as HARQ feedback enabled, and the other subset (e.g. the second subset) can be used for indication of Option 1B as well as HARQ feedback enabled. As mentioned above, the subsets for Option 1A and Option 1B are configured, specifically, the mapping of field values/states to each subset may be pre-defined or configured. In some embodiments, the field values/states for each subset may be configured/reconfigured by the NW through RRC signaling. NW may indicate the HARQ-ACK resource via DCI from different subsets based on the requirement on whether UE need to wait RTT+3 ms for PDCCH monitoring. In some other embodiments, the network may configure one table with the index and the corresponding subset values through RRC signaling. The NW may indicate the HARQ-ACK resource for each grant in the DCI scheduled PDSCH with the resource index indicated through a new MAC CE.

In some other examples (may be called as Option 2B), the above DCI indication can be achieved by reusing/reinterpreting the fields of "repetition number" or "MCS" in the DCI. The NW may configure one subset of values in the DCI for "repetition number" or "MCS", so less bits are needed for indication of "repetition number" or "MCS", the remaining one bit may be used to indicate Option 1A or Option 1B. Option 1A above may be an example corresponding the embodiments in which the terminal device 110 waits for a time length prior to the operation associated with the PDCCH monitoring and/or the DRX, and Option 1B above may be an example corresponding the embodiments in which the terminal device 110 prevents from waiting for the time length prior to the operation associated with the PDCCH monitoring and/or the DRX.

Figure 4:
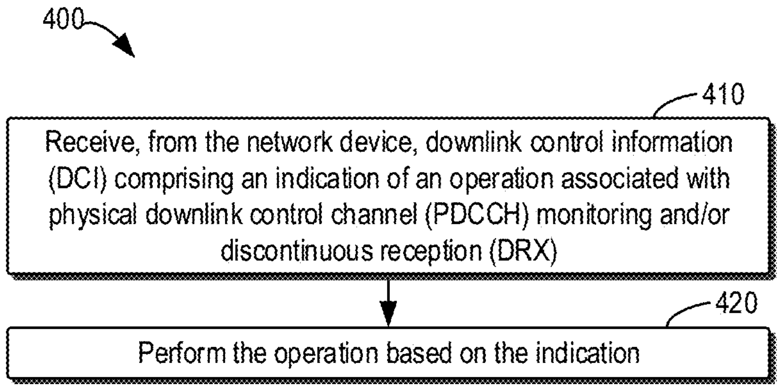
FIG. 4 illustrates a flowchart of a method implemented at a terminal device according to some embodiments of the present disclosure.

FIG. 4 illustrates a flowchart of a method implemented at a terminal device according to some embodiments of the present disclosure. For the purpose of discussion, the method 400 will be described from the perspective of the terminal device 110 with reference to FIG. 1.

At block 410, the terminal device 110 may receive, from the network device 130, downlink control information (DCI) comprising an indication of an operation associated with physical downlink control channel (PDCCH) monitoring and/or discontinuous reception (DRX). At block 420, the terminal device 110 may perform the operation based on the indication.

In some embodiments, the terminal device 110 may receive, from the network device 130, a configuration comprising at least one set of values associated with a field of the DCI, wherein the indication includes one of a set of values among the at least one set of values.

In some embodiments, the set of values may comprise: a first subset associated with waiting for a time length prior to the operation associated with at least one of the PDCCH monitoring or the DRX, and a second subset associated with not waiting for the time length prior to the operation associated with at least one of the PDCCH monitoring or the DRX.

In some embodiments, in order to perform the operation associated with at least one of the PDCCH monitoring or the DRX, the terminal device 110 may, based on determining that the indication includes a value among the first subset, waiting for a time length prior to the operation associated with at least one of the PDCCH monitoring or the DRX, or based on determining that the indication includes a value among the second subset, preventing from waiting for the time length prior to the operation associated with at least one of the PDCCH monitoring or the DRX.

In some embodiments, the time length may be referred to as a first time length. In order to prevent from waiting for the time length, the terminal device 110 may prevent from waiting for the first time length prior to the operation associated with the PDCCH monitoring, and monitoring the PDCCH in a subframe starting from the end of a hybrid automatic repeat request (HARQ) feedback transmission plus a second time length.

In some embodiments, in order to prevent from waiting for the time length, the terminal device 110 may prevent from waiting for the time length prior to the operation associated with the DRX, and prevent from starting a timer associated with HARQ round trip time (RTT) for a HARQ process.

In some embodiments, the time length may be referred to as a first time length. In order to prevent from waiting for the time length, the terminal device 110 may prevent from waiting for the first time length prior to the operation associated with the DRX, and may enter a DRX active state in a subframe starting from the end of a HARQ feedback transmission plus a second time length. In some embodiments, in order to enter the DRX active state, the terminal device 110 may start or restart, from the end of a HARQ feedback transmission plus the second time length, a timer associated with DRX inactivity. In some embodiments, in the event that the terminal device 110 enters the DRX active state, the terminal device 110 may be in active for a time duration. The time duration may be associated with one of the following: a timer associated with DRX-retransmission or a short transmission time interval (TTI) of the timer associated with DRX-retransmission for a HARQ process; or a timer associated with DRX inactivity. In some embodiments, the timer associated with DRX inactivity is a drx-Inactivity Timer.

In some embodiments, the second time length may be a guard period for uplink to downlink switch, for example, one millisecond.

In some embodiments, in order to wait for the time length, the terminal device 110 may wait for the time length prior to the operation associated with the DRX, wherein a timer associated with HARQ RTT for a HARQ process is increased by a RTT.

In some embodiments, in the event that the configuration comprises one set of values, the field of the DCI may be a hybrid automatic repeat request acknowledgement (HARQ-ACK) resource field, or a repetition number field, or a modulation and coding scheme (MCS) field.

In some embodiments, in the event that the configuration comprises a plurality of sets of values, the field of the DCI may be a HARQ-ACK resource field.

In some embodiments, the plurality of sets of values may be configured in a table. Each of the plurality of sets of values corresponds to an index, and an index corresponding to one of the plurality of sets of values may be included in a MAC CE.

In some embodiments, HARQ feedback in a HARQ process associated with the operation may be configured as disabled through a radio resource control (RRC) signaling; and the DCI indicates that the HARQ feedback is enabled.

In some embodiments, the time length equals to RTT plus a predetermined duration. In some examples, the predetermined duration may be predetermined network device processing time.

In some embodiments, the terminal device of claim 4, wherein in the event that the field of the DCI is a HARQ-ACK resource field, the set of values comprising the first subset and the second subset are for indicating HARQ feedback in a HARQ process associated with the operation as enabled.

Figure 5:
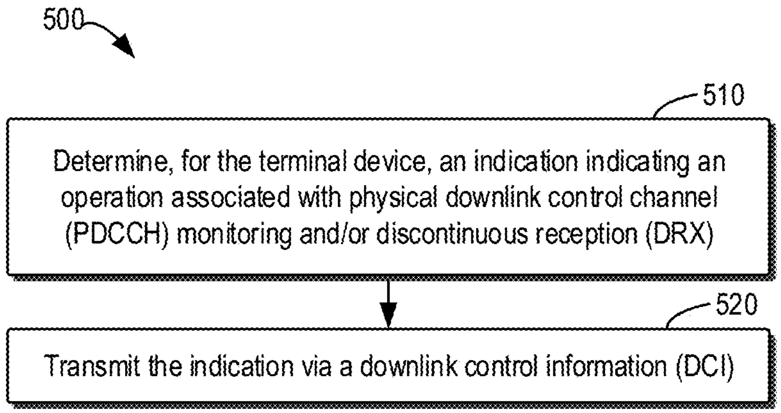
FIG. 5 illustrates a flowchart of a method implemented at a network device according to some embodiments of the present disclosure.

FIG. 5 shows a flowchart of an example method 500 implemented at a network device in accordance with some embodiments of the present disclosure. For the purpose of discussion, the method 500 will be described from the perspective of the network device 130 with reference to FIG. 1.

At block 510, the network device 130 determines, for the terminal device 110, an indication indicating an operation associated with physical downlink control channel (PDCCH) monitoring and/or discontinuous reception (DRX). At block 520, the network device 130 transmits the indication via a downlink control information (DCI).

In some embodiments, the network device 130 may transmit, to the terminal device 110, a configuration comprising at least one set of values associated with a field of the DCI, wherein the indication includes one of a set of values among the at least one set of values.

In some embodiments, the set of values comprise: a first subset associated with waiting for a time length prior to the operation associated with at least one of the PDCCH monitoring or the DRX, and a second subset associated with not waiting for the time length prior to the operation associated with at least one of the PDCCH monitoring or the DRX.

In some embodiments, in the event that the configuration comprises one set of values, the field of the DCI is a hybrid automatic repeat request acknowledgement (HARQ-ACK) resource field, or a repetition number field, or a modulation and coding scheme (MCS) field.

In some embodiments, in the event that the configuration comprises a plurality of sets of values, the field of the DCI is a HARQ-ACK resource field.

In some embodiments, the plurality of sets of values are configured in a table, each of the plurality of sets of values corresponds to an index, and an index corresponding to one of the plurality of sets of values is included in a MAC CE.

In some embodiments, the network device 130 may configure, for a HARQ process associated with the operation and through a radio resource control (RRC) signaling, HARQ feedback as disabled, and may indicate, by the DCI, the HARQ feedback as enabled.

In some embodiments, the time length equals to round trip time (RTT) plus a predetermined duration. In some examples, the predetermined duration may be predetermined network device processing time.

In some embodiments, an apparatus capable of performing any of the method 400 (for example, the terminal device 110) may comprise means for performing the respective steps of the method 400. The means may be implemented in any suitable form. For example, the means may be implemented in a circuitry or software module.

In some embodiments, the apparatus comprises means for receiving, from a network device, downlink control information (DCI) comprising an indication of an operation associated with at least one of physical downlink control channel (PDCCH) monitoring or discontinuous reception (DRX); and means for performing the operation based on the indication.

In some embodiments, the apparatus further comprises means for receiving, from the network device, a configuration comprising at least one set of values associated with a field of the DCI, wherein the indication includes one of a set of values among the at least one set of values.

In some embodiments, the set of values comprise: a first subset associated with waiting for a time length prior to the operation associated with at least one of the PDCCH monitoring or the DRX; and a second subset associated with not waiting for the time length prior to the operation associated with at least one of the PDCCH monitoring or the DRX.

In some embodiments, the means for performing the operation comprises means for, based on determining that the indication includes a value among the first subset, waiting for a time length prior to the operation associated with at least one of the PDCCH monitoring or the DRX; or means for based on determining that the indication includes a value among the second subset, preventing from waiting for the time length prior to the operation associated with at least one of the PDCCH monitoring or the DRX.

In some embodiments, the time length is a first time length and the means for preventing from waiting for the time length comprises means for preventing from waiting for the first time length prior to the operation associated with the PDCCH monitoring; and means for monitoring the PDCCH in a subframe starting from the end of a hybrid automatic repeat request (HARQ) feedback transmission plus a second time length.

In some embodiments, the means for preventing from waiting for the time length comprises means for preventing from waiting for the time length prior to the operation associated with the DRX; and means for preventing from starting a timer associated with HARQ round trip time (RTT) for a HARQ process.

In some embodiments, the time length is a first time length, and the means for preventing from waiting for the time length comprises means for preventing from waiting for the first time length prior to the operation associated with the DRX; and means for entering a DRX active state in a subframe starting from the end of a HARQ feedback transmission plus a second time length.

In some embodiments, the means for entering the DRX active state comprises means for starting or restarting, from the end of a HARQ feedback transmission plus the second time length, a timer associated with DRX inactivity.

In some embodiments, the apparatus further comprises means for, in the event that the terminal device enters the DRX active state, being in active for a time duration. The time duration is associated with one of the following: a timer associated with DRX-retransmission or a short transmission time interval (TTI) of the timer associated with DRX-retransmission for a HARQ process; or a timer associated with DRX inactivity.

In some embodiments, the timer associated with DRX inactivity is a drx-Inactivity Timer.

In some embodiments, the second time length is a guard period for uplink to downlink switch, for example, one millisecond.

In some embodiments, the means for waiting for the time length comprises mean for waiting for the time length prior to the operation associated with the DRX. A timer associated with HARQ RTT for a HARQ process is increased by a RTT.

In some embodiments, in the event that the configuration comprises one set of values, the field of the DCI is a hybrid automatic repeat request acknowledgement (HARQ-ACK) resource field; or a repetition number field; or a modulation and coding scheme (MCS) field.

In some embodiments, in the event that the configuration comprises a plurality of sets of values, the field of the DCI is a HARQ-ACK resource field.

In some embodiments, the plurality of sets of values are configured in a table, wherein each of the plurality of sets of values corresponds to an index, and an index corresponding to one of the plurality of sets of values is included in a MAC CE.

In some embodiments, HARQ feedback in a HARQ process associated with the operation is configured as disabled through a radio resource control (RRC) signaling; and the DCI indicates that the HARQ feedback is enabled.

In some embodiments, the time length equals to RTT plus a predetermined duration. In some examples, the predetermined duration may be predetermined network device processing time.

In some embodiments, in the event that the field of the DCI is a HARQ-ACK resource field, the set of values comprising the first subset and the second subset are for indicating HARQ feedback in a HARQ process associated with the operation as enabled.

In some embodiments, the apparatus further comprises means for performing other steps in some embodiments of the method 400. In some embodiments, the means comprises at least one processor and at least one memory including computer program code, the at least one memory and computer program code configured to, with the at least one processor, cause the performance of the apparatus.

In some embodiments, an apparatus capable of performing any of the method 500 (for example, the network device 130) may comprise means for performing the respective steps of the method 500. The means may be implemented in any suitable form. For example, the means may be implemented in a circuitry or software module.

In some embodiments, the apparatus comprises means for determining, for a terminal device, an indication indicating an operation associated with at least one of physical downlink control channel (PDCCH) monitoring or discontinuous reception (DRX); and means for transmitting the indication via a downlink control information (DCI).

In some embodiments, the apparatus further comprises means for transmitting, to the terminal device, a configuration comprising at least one set of values associated with a field of the DCI. The indication includes one of a set of values among the at least one set of values.

In some embodiments, the set of values comprise a first subset associated with waiting for a time length prior to the operation associated with at least one of the PDCCH monitoring or the DRX, and a second subset associated with not waiting for the time length prior to the operation associated with at least one of the PDCCH monitoring or the DRX.

In some embodiments, in the event that the configuration comprises one set of values, the field of the DCI is a hybrid automatic repeat request acknowledgement (HARQ-ACK) resource field; or a repetition number field; or a modulation and coding scheme (MCS) field.

In some embodiments, in the event that the configuration comprises a plurality of sets of values, the field of the DCI is a HARQ-ACK resource field.

In some embodiments, the plurality of sets of values are configured in a table, and each of the plurality of sets of values corresponds to an index. An index corresponding to one of the plurality of sets of values is included in a media access control (MAC) control element (CE).

In some embodiments, the apparatus further comprises means for configuring, for a HARQ process associated with the operation and through a radio resource control (RRC) signaling, HARQ feedback as disabled, and means for indicating, by the DCI, the HARQ feedback as enabled.

In some embodiments, the time length equals to round trip time (RTT) plus a predetermined duration. In some examples, the predetermined duration may be predetermined network device processing time.

In some embodiments, the apparatus further comprises means for performing other steps in some embodiments of the method 500. In some embodiments, the means comprises at least one processor and at least one memory including computer program code, the at least one memory and computer program code configured to, with the at least one processor, cause the performance of the apparatus.

Figure 6:
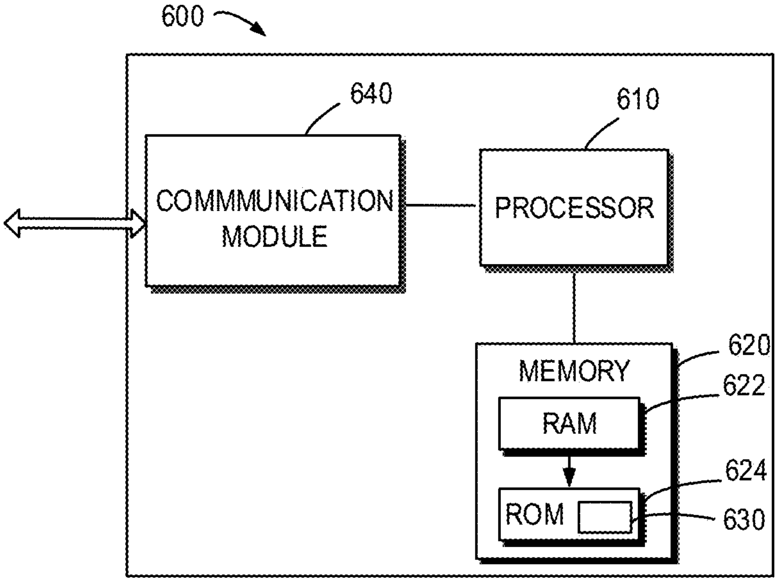
FIG. 6 illustrates a simplified block diagram of an apparatus that is suitable for implementing embodiments of the present disclosure.

FIG. 6 is a simplified block diagram of a device 600 that is suitable for implementing embodiments of the present disclosure. The device 600 may be provided to implement the communication device, for example the terminal device 110, the network device 130 as shown in FIG. 1. As shown, the device 600 includes one or more processors 610, one or more memories 620 coupled to the processor 610, and one or more communication modules 640 coupled to the processor 610.

The communication modules 640 is for bidirectional communications. The communication modules 640 has at least one antenna to facilitate communication. The communication interface may represent any interface that is necessary for communication with other network elements.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 622 and other volatile memories that will not last in the power-down duration.

A computer program 630 includes computer executable instructions that are executed by the associated processor 610. The program 630 may be stored in the ROM 624. The processor 610 may perform any suitable actions and processing by loading the program 630 into the RAM 622.

The embodiments of the present disclosure may be implemented by means of the program 630 so that the device 600 may perform any process of the disclosure as discussed with reference to FIGS. 2 to 5. The embodiments of the present disclosure may also be implemented by hardware or by a combination of software and hardware.

Figure 7:
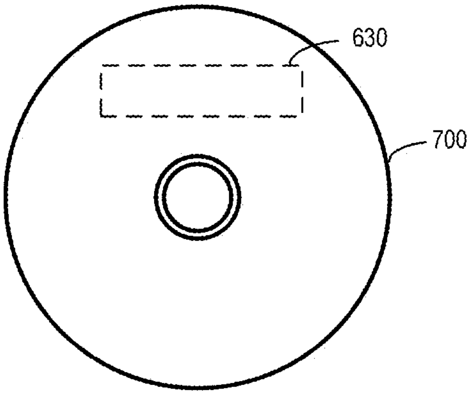
FIG. 7 illustrates a block diagram of an example computer readable medium in accordance with some embodiments of the present disclosure.

In some embodiments, the program 630 may be tangibly contained in a computer readable medium which may be included in the device 600 (such as in the memory 620) or other storage devices that are accessible by the device 600. The device 600 may load the program 630 from the computer readable medium to the RAM 622 for execution. The computer readable medium may include any types of tangible non-volatile storage, such as ROM, EPROM, a flash memory, a hard disk, CD, DVD, and the like. FIG. 7 shows an example of the computer readable medium 700 in form of CD or DVD. The computer readable medium has the program 630 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 400 or 500 as described above with reference to FIGS. 2-5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. The term "non-transitory," as used herein, is a limitation of the medium itself (i.e., tangible, not a signal) as opposed to a limitation on data storage persistency (e.g., RAM vs. ROM).

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A terminal device comprising:
at least one processor; and
at least one memory storing instructions that, when executed by the at least one processor, cause the terminal device at least to:
receive, from a network device, downlink control information (DCI) comprising an indication of an operation associated with a physical downlink control channel (PDCCH) monitoring and discontinuous reception (DRX);
receive, from the network device, a configuration comprising at least one set of values associated with a field of the DCI, wherein the indication includes a set of values among the at least one set of values, wherein the set of values comprise: a first subset associated with waiting for a time length prior to the operation associated with the PDCCH monitoring and the DRX; and a second subset associated with not waiting for the time length prior to the operation associated with the PDCCH monitoring and the DRX; and
based on determining that the indication includes a value among the second subset:
preventing from waiting for the time length prior to the operation associated with the PDCCH monitoring and the DRX by:
preventing from waiting for the time length prior to the operation associated with the DRX;
preventing from starting a timer associated with a hybrid automatic repeat request (HARQ) round trip time (RTT) for a HARQ process;
monitoring the PDCCH in a subframe starting from an end of a HARQ feedback transmission plus a second time length;
entering a DRX active state in a subframe starting from the end of the HARQ feedback transmission plus the second time length by restarting, from the end of the HARQ feedback transmission plus the second time length, a timer associated with DRX inactivity, and
remaining in the DRX active state for a time duration, wherein the time duration is associated with the following: a timer associated with DRX-retransmission or a short transmission time interval (TTI) of the timer associated with DRX-retransmission for the HARQ process; and a timer associated with DRX inactivity.

2. The terminal device of claim 1, wherein the timer associated with DRX inactivity is a drx-InactivityTimer.

3. The terminal device of claim 2, wherein the second time length is a guard period for uplink to downlink switch.

4. The terminal device of claim 3, wherein waiting for the time length prior to the operation associated with the DRX comprises increasing a timer associated with HARQ RTT for a HARQ process by a RTT.

5. The terminal device of claim 3, wherein when the configuration comprises one set of values, the field of the DCI is one of the following:
a hybrid automatic repeat request acknowledgement (HARQ-ACK) resource field;
a repetition number field; or
a modulation and coding scheme (MCS) field.

6. The terminal device of claim 3, wherein in the event that the configuration comprises a plurality of sets of values, the field of the DCI is a HARQ-ACK resource field.

7. The terminal device of claim 6, wherein the plurality of sets of values are configured in a table, wherein each of the plurality of sets of values corresponds to an index, and an index corresponding to one of the plurality of sets of values is included in a media access control (MAC) control element (CE).

8. The terminal device of claim 7, wherein:
HARQ feedback in the HARQ process associated with the operation is configured as disabled through a radio resource control (RRC) signaling; and
the DCI indicates that the HARQ feedback is enabled.

9. The terminal device of claim 8, wherein the time length is equal to RTT plus a predetermined duration.

10. The terminal device of claim 9, wherein when the field of the DCI is a HARQ-ACK resource field, the set of values comprising the first subset and the second subset are for indicating HARQ feedback in a HARQ process associated with the operation as enabled.

11. A system comprising:
a terminal device:
at least one processor; and
at least one memory storing instructions that, when executed by the at least one processor, cause the terminal device at least to:
receive, from a network device, downlink control information (DCI) comprising an indication of an operation associated with a physical downlink control channel (PDCCH) monitoring and discontinuous reception (DRX);

receive, from the network device, a configuration comprising at least one set of values associated with a field of the DCI, wherein the indication includes a set of values among the at least one set of values, wherein the set of values comprise: a first subset associated with waiting for a time length prior to the operation associated with the PDCCH monitoring and the DRX; and a second subset associated with not waiting for the time length prior to the operation associated with the PDCCH monitoring and the DRX; and based on determining that the indication includes a value among the second subset:

preventing from waiting for the time length prior to the operation associated with the PDCCH monitoring and the DRX by:

preventing from waiting for the time length prior to the operation associated with the DRX;

preventing from starting a timer associated with a hybrid automatic repeat request (HARQ) round trip time (RTT) for a HARQ process;

monitoring the PDCCH in a subframe starting from an end of a HARQ feedback transmission plus a second time length;

entering a DRX active state in a subframe starting from the end of the HARQ feedback transmission plus the second time length by restarting, from the end of the HARQ feedback transmission plus the second time length, a timer associated with DRX inactivity, and remaining in the DRX active state for a time duration, wherein the time duration is associated with the following: a timer associated with DRX-retransmission or a short transmission time interval (TTI) of the timer associated with DRX-retransmission for the HARQ process; and a timer associated with DRX inactivity.

12. The terminal device of claim 1, wherein the timer associated with DRX inactivity is a drx-InactivityTimer.

13. The terminal device of claim 2, wherein the second time length is a guard period for uplink to downlink switch.

14. The terminal device of claim 3, wherein waiting for the time length prior to the operation associated with the DRX comprises increasing a timer associated with HARQ RTT for a HARQ process by a RTT.

15. The terminal device of claim 3, wherein when the configuration comprises one set of values, the field of the DCI is one of the following:

a hybrid automatic repeat request acknowledgement (HARQ-ACK) resource field;

a repetition number field; or a modulation and coding scheme (MCS) field.

16. The terminal device of claim 3, wherein in the event that the configuration comprises a plurality of sets of values, the field of the DCI is a HARQ-ACK resource field.

17. The terminal device of claim 6, wherein the plurality of sets of values are configured in a table, wherein each of the plurality of sets of values corresponds to an index, and an index corresponding to one of the plurality of sets of values is included in a media access control (MAC) control element (CE).

18. The terminal device of claim 7, wherein:

HARQ feedback in the HARQ process associated with the operation is configured as disabled through a radio resource control (RRC) signaling; and the DCI indicates that the HARQ feedback is enabled.

19. The terminal device of claim 8, wherein the time length is equal to RTT plus a predetermined duration.

20. A method comprising:

receiving, from a network device, downlink control information (DCI) comprising an indication of an operation associated with a physical downlink control channel (PDCCH) monitoring and discontinuous reception (DRX);

receiving, from the network device, a configuration comprising at least one set of values associated with a field of the DCI, wherein the indication includes a set of values among the at least one set of values, wherein the set of values comprise: a first subset associated with waiting for a time length prior to the operation associated with the PDCCH monitoring and the DRX; and a second subset associated with not waiting for the time length prior to the operation associated with the PDCCH monitoring and the DRX; and based on determining that the indication includes a value among the second subset:

preventing from waiting for the time length prior to the operation associated with the PDCCH monitoring and the DRX by:

preventing from waiting for the time length prior to the operation associated with the DRX;

preventing from starting a timer associated with a hybrid automatic repeat request (HARQ) round trip time (RTT) for a HARQ process;

monitoring the PDCCH in a subframe starting from an end of a HARQ feedback transmission plus a second time length;

entering a DRX active state in a subframe starting from the end of the HARQ feedback transmission plus the second time length by restarting, from the end of the HARQ feedback transmission plus the second time length, a timer associated with DRX inactivity, and remaining in the DRX active state for a time duration, wherein the time duration is associated with the following: a timer associated with DRX-retransmission or a short transmission time interval (TTI) of the timer associated with DRX-retransmission for the HARQ process; and a timer associated with DRX inactivity.

* * * * *